US010935830B1

(12) United States Patent
Cho et al.

(10) Patent No.: US 10,935,830 B1
(45) Date of Patent: Mar. 2, 2021

(54) APPARATUSES, SYSTEMS, AND METHODS FOR HEATING A LIQUID CRYSTAL DISPLAY SCREEN

(71) Applicant: FACEBOOK TECHNOLOGIES, LLC, Menlo Park, CA (US)

(72) Inventors: Richard Han Soo Cho, Sunnyvale, CA (US); Cheonhong Kim, Mountain View, CA (US); Dong Chen, Foster City, CA (US); Nirav Rajendra Patel, San Francisco, CA (US)

(73) Assignee: Facebook Technologies, LLC, Menlo Park, CA (US)

( * ) Notice: Subject to any disclaimer, the term of this patent is extended or adjusted under 35 U.S.C. 154(b) by 349 days.

(21) Appl. No.: 15/811,906

(22) Filed: Nov. 14, 2017

(51) Int. Cl.
  *G02F 1/1335* (2006.01)
  *G02F 1/1333* (2006.01)
  *G02F 1/133* (2006.01)
  *F16M 13/04* (2006.01)
(52) U.S. Cl.
  CPC .... *G02F 1/133382* (2013.01); *G02F 1/13306* (2013.01); *F16M 13/04* (2013.01)

(58) Field of Classification Search
  None
  See application file for complete search history.

(56) References Cited

U.S. PATENT DOCUMENTS

| 2003/0231157 A1* | 12/2003 | Sugino | G02F 1/133382 345/101 |
| 2016/0334666 A1* | 11/2016 | Liu | G02F 1/133382 |

\* cited by examiner

*Primary Examiner* — Richard H Kim
(74) *Attorney, Agent, or Firm* — FisherBroyles, LLP

(57) ABSTRACT

A display system may include 1) a plurality of electronic components, 2) an LCD screen that is heatable at a base heating rate by operation of the LCD screen and one or more of the plurality of electronic components, and 3) a heating subsystem for heating the LCD screen at an accelerated heating rate that is greater than the base heating rate to raise a temperature of the LCD screen above a threshold screen temperature. A head-mounted-display device may include 1) a display housing, 2) a plurality of electronic components disposed within the display housing, 3) an LCD screen disposed within the display housing, and 4) a heating subsystem for heating the LCD screen at an accelerated heating rate. Various other apparatuses, systems, and methods are also disclosed.

14 Claims, 9 Drawing Sheets

APPARATUSES, SYSTEMS, AND METHODS FOR HEATING A LIQUID CRYSTAL DISPLAY SCREEN

BACKGROUND

Virtual reality and augmented reality headsets are widely gaining in popularity for use in a growing number of activities. Such headsets may integrate visual information into a user's field of view to enhance their surroundings or allow them to step into immersive three-dimensional environments. While virtual reality and augmented reality headsets are often utilized for gaming and other entertainment purposes, they are also commonly employed for purposes outside of recreation—for example, governments may use them for military training simulations, doctors may use them to practice surgery, and engineers may use them as visualization aids. Virtual and augmented reality systems are also increasingly recognized for their utility in facilitating interpersonal interactions between individuals in a variety of contexts.

Due to the compact size of many virtual and augmented reality headsets, display screens utilized in such headsets may need to have a small profile while also displaying high-quality, high-resolution images. Since a wearer's eyes may be positioned in relatively close proximity to the display screen, which may be further magnified by lenses of the headset, any inconsistencies in a displayed image may be more readily apparent to a headset user than such inconsistencies in other types of display devices. Liquid crystal display (LCD) screens, which are often integrated into headsets due to their comparatively lower cost and high availability, may exhibit certain image display issues when operated under various conditions. For example, pixel response times may be decreased at lower temperatures, leading to blurred or double images. As a result, a user's experience with a headset may be sub-optimal in colder conditions.

SUMMARY

As will be described in greater detail below, the instant disclosure describes various apparatuses, systems, and methods for heating LCD screens. In one example, a display system may include 1) a plurality of electronic components, 2) an LCD screen that is heatable at a base heating rate by operation of the LCD screen and one or more of the plurality of electronic components, and 3) a heating subsystem for heating the LCD screen at an accelerated heating rate that is greater than the base heating rate to raise a temperature of the LCD screen above a threshold screen temperature.

In at least one embodiment, the heating subsystem may include a display-heating module that increases an operating speed of at least one electronic component of the plurality of electronic components to generate additional heat at the at least one electronic component. The display-heating module may increase the operating speed of the at least one electronic component by providing superfluous commands to the at least one electronic component. In some examples, the heating subsystem may also include a thermally conductive layer disposed between the at least one electronic component and the LCD screen. The at least one electronic component may include at least one of a processing device, a power management device, a memory device, and a communication device. In at least one example, the heating subsystem may include a display-heating module that drives at least one of the plurality of electronic components or at least a portion of the LCD screen while an image is not displayed by the LCD screen. In this example, the display-heating module may drive at least the portion of the LCD screen by providing scanning data to at least one of a display driver or a backlight unit of the LCD screen.

In some embodiments, the threshold screen temperature may be a temperature of between approximately 10° C. and approximately 25° C. According to at least one embodiment, the LCD screen may include a front surface through which image light is emitted and a rear surface disposed opposite the front surface. In this example, the heating subsystem may produce heat at a location at or adjacent to the rear surface of the LCD screen. In at least one example, the heating subsystem may include a thermally conductive layer disposed adjacent to at least a portion of the LCD screen. The thermally conductive layer may include at least one of a metal material, a metalloid material, a graphene material, a diamond material, a ceramic material, or a polymer material.

According to at least one embodiment, the heating subsystem may include a heating element disposed near at least a portion of the LCD screen. In this example, the heating subsystem may include a capacitor electrically coupled to the heating element. The heating element may be include a portion of a heating film overlapping at least a portion of a surface of the LCD screen. In some embodiments, the heating subsystem may initiate the heating of the LCD screen at the accelerated heating rate at startup of the display system. The heating subsystem may end the heating of the LCD screen at the accelerated heating rate following heating of the LCD screen for a specified period of time. In at least one embodiment, the display system may also include a temperature sensor. In this example, the heating subsystem may initiate the heating of the LCD screen when an initial temperature detected by the temperature sensor is below a threshold sensor temperature. Additionally or alternatively, the heating subsystem may end the heating of the LCD screen when a subsequent temperature detected by the temperature sensor is at or above a threshold sensor temperature.

A corresponding head-mounted-display device may include 1) a display housing, 2) a plurality of electronic components disposed within the display housing, 3) an LCD screen disposed within the display housing, the LCD screen being heatable at a base heating rate by operation of the LCD screen and one or more of the plurality of electronic components, and 4) a heating subsystem for heating the LCD screen at an accelerated heating rate that is greater than the base heating rate to raise a temperature of the LCD screen above a threshold screen temperature.

In addition, a corresponding method may include 1) operating an LCD screen and a plurality of electronic components, the LCD screen being heatable at a base heating rate by operation of the LCD screen and the plurality of electronic components, and 2) heating, by a heating subsystem, the LCD screen at an accelerated heating rate that is greater than the base heating rate to raise a temperature of the LCD screen above a threshold screen temperature.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification.

Together with the following description, these drawings demonstrate and explain various principles of the instant disclosure.

Figure 1:
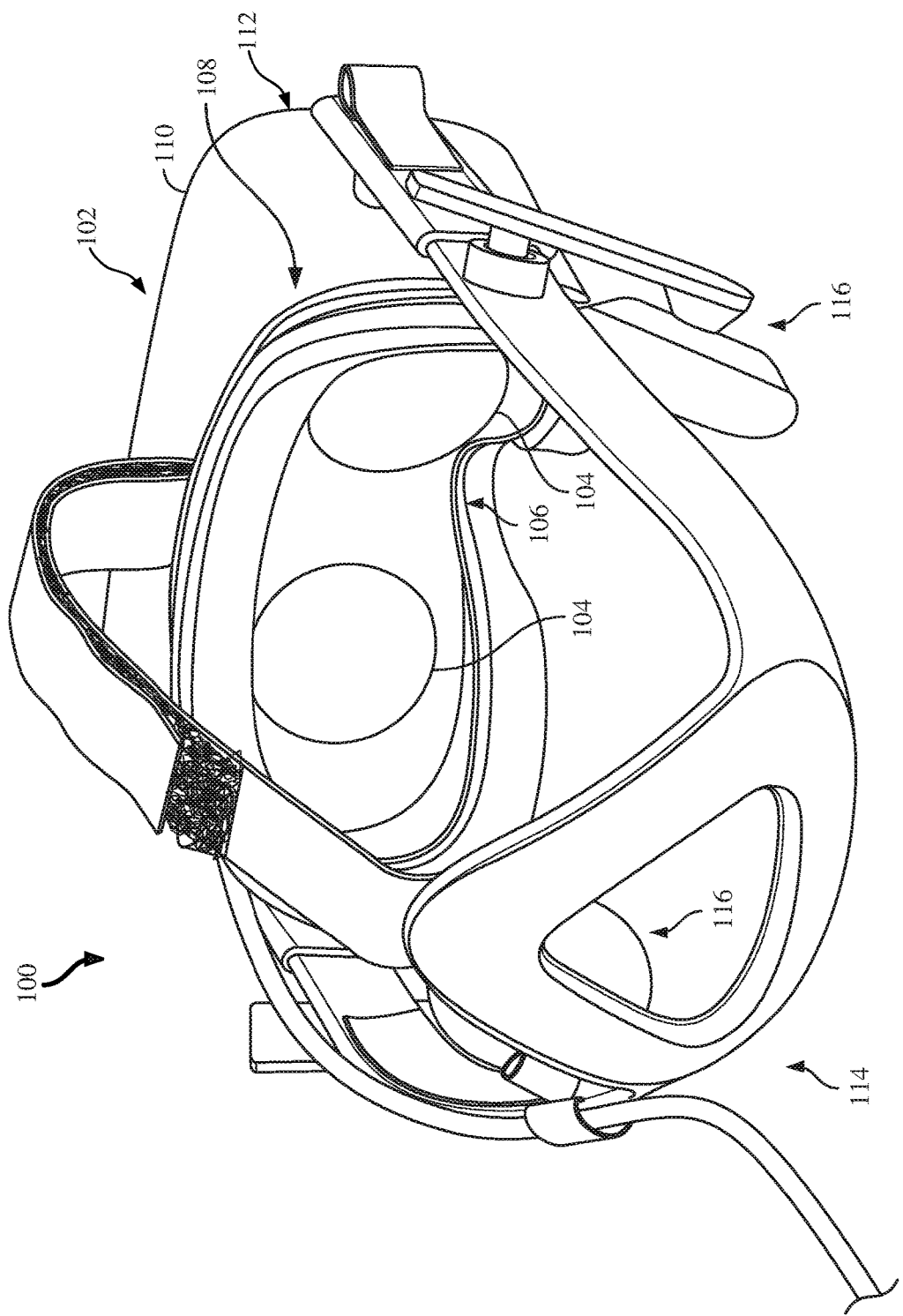
FIG. 1 is a perspective view of an exemplary head-mounted-display system in accordance with some embodiments.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to apparatuses, systems, and methods for heating LCD screens. As will be explained in greater detail below, embodiments of the instant disclosure may have a display system that includes an LCD screen and a heating subsystem for accelerating heating of the LCD screen. The heating subsystem may accelerate heating of the LCD screen in one or more manners. For example, the heating subsystem may increase an operating speed of at least one electronic component of the display system to generate additional heat at the at least one electronic component. The additional heat generated at the at least one electronic component may accelerate heating of the LCD screen above a base heating rate. In some examples, the heating subsystem may drive at least one of the plurality of electronic components or at least a portion of the LCD screen to pre-heat the LCD screen prior to displaying images on the LCD screen. A thermally conductive layer may be disposed adjacent to and/or near a rear surface or other surface portion of the LCD screen to conduct and/or spread heat from heated components to various portions of the LCD screen. In at least one example, a heating element may be disposed adjacent to and/or near at least a portion of the LCD screen. The heating element may be heated by a power source, such as a supercapacitor or other energy storage device, to accelerate heating of the LCD screen.

Accelerating heating of LCD screens may quickly bring the LCD screens up to desirable operating temperatures in various conditions. Rapidly increasing the temperature of LCD screens may substantially reduce or eliminate the appearance of image inconsistencies, such as blurring and/or double images, particularly during operation of the LCD screens after startup of the LCD screens and/or following a low-power use state. Such systems may enhance user experiences while using LCD devices, such as head-mounted-display devices, in a variety of environments, including colder environments below approximately 20° C.

The following will provide, with reference to FIGS. 1-4, examples of head-mounted-display systems and devices. In addition, the discussion corresponding to FIGS. 5-8B will provide examples of components of head-mounted display devices, including LCD screens and apparatuses and systems for heating the LCD screens. Finally, the discussion corresponding to FIG. 9 will provide examples of methods for heating LCD screens.

FIG. 1 is a perspective view of a head-mounted-display system 100 in accordance with some embodiments. In some embodiments, head-mounted-display system 100 may include a head-mounted-display device 102, a facial-interface system 108, a strap assembly 114, and audio subsystems 116. A head-mounted-display device may include any type or form of display device or system that is worn on or about a user's head and displays visual content to the user. Head-mounted-display devices may display content in any suitable manner, including via a screen (e.g., an LCD or LED screen), a projector, a cathode ray tube, an optical mixer, etc. Head-mounted-display devices may display content in one or more of various media formats. For example, a head-mounted-display device may display video, photos, and/or computer-generated imagery (CGI). Head-mounted-display device 102 may include a display housing 110 surrounding various components of head-mounted-display device 102, including lenses 104 and various electronic components, including display components as described herein. Display housing 110 may include a housing back surface 112 and side surfaces surrounding the internal components, and an opening surrounding a viewing region 106 at a front side of display housing 110.

Head-mounted-display devices may provide diverse and distinctive user experiences. Some head-mounted-display devices may provide virtual-reality experiences (i.e., they may display computer-generated or pre-recorded content), while other head-mounted displays may provide real-world experiences (i.e., they may display live imagery from the physical world). Head-mounted displays may also provide any mixture of live and virtual content. For example, virtual content may be projected onto the physical world (e.g., via optical or video see-through), which may result in augmented reality or mixed reality experiences. Head-mounted-display devices may be configured to be mounted to a user's head in a number of ways. Some head-mounted-display devices may be incorporated into glasses or visors. Other head-mounted-display devices may be incorporated into helmets, hats, or other headwear. Examples of head-mounted-display devices may include OCULUS RIFT, GOOGLE GLASS, VIVE, SAMSUNG GEAR, etc.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewers.

In some embodiments, audio subsystems 116 may be integrated with head-mounted-display device 102 and may provide audio signals to the user's ears in conjunction with or separate from displayed content. Head-mounted-display system 100 may, for example, have two audio subsystems 116 located on the left and right sides of head-mounted-display system 100 to provide audio signals to the user's left and right ears, as shown in FIG. 1.

Strap assembly 114 may be used for adjustably mounting head-mounted-display device 102 on the user's head. As shown in FIG. 1, strap assembly 114 may include and lower straps and/or an upper strap that are coupled to head-mounted-display device 102 to adjustably conform to the top and/or sides of the user's head when the user is wearing head-mounted-display system 100. In some embodiments, strap assembly 114 may include a back piece coupled with the upper strap and lower straps to rest against the back of the user's head (e.g., around the user's occipital lobe). In at least one embodiment, the back piece may include an opening that is dimensioned and positioned to securely fit around a back portion (e.g., a portion of the user's occipital lobe) of the user's head.

In some embodiments, facial-interface system 108 may be configured to comfortably rest against a region of the user's face, including a region surrounding the user's eyes, when head-mounted-display system 100 is worn by the user. In these embodiments, facial-interface system 108 may include an interface cushion that is configured to rest against portions of the user's face (e.g., at least a portion of the user's nasal, cheek, temple, and/or forehead facial regions). Facial-interface system 108 may surround viewing region 106, which includes the user's field of vision, allowing the user to look through lenses 104 of head-mounted-display device 102 without interference from outside light while the user is wearing head-mounted-display system 100.

Figure 2A:
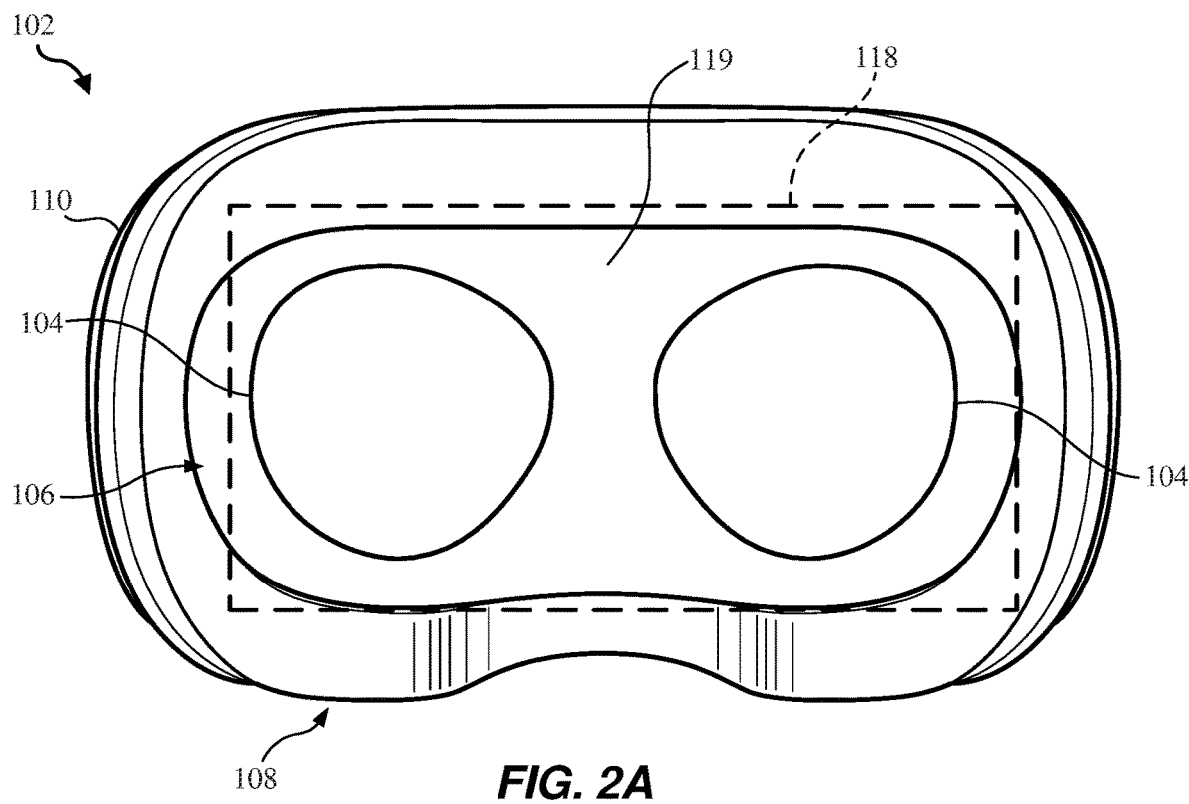
FIG. 2A is a front view of an exemplary head-mounted-display device in accordance with some embodiments.
Figure 2B:
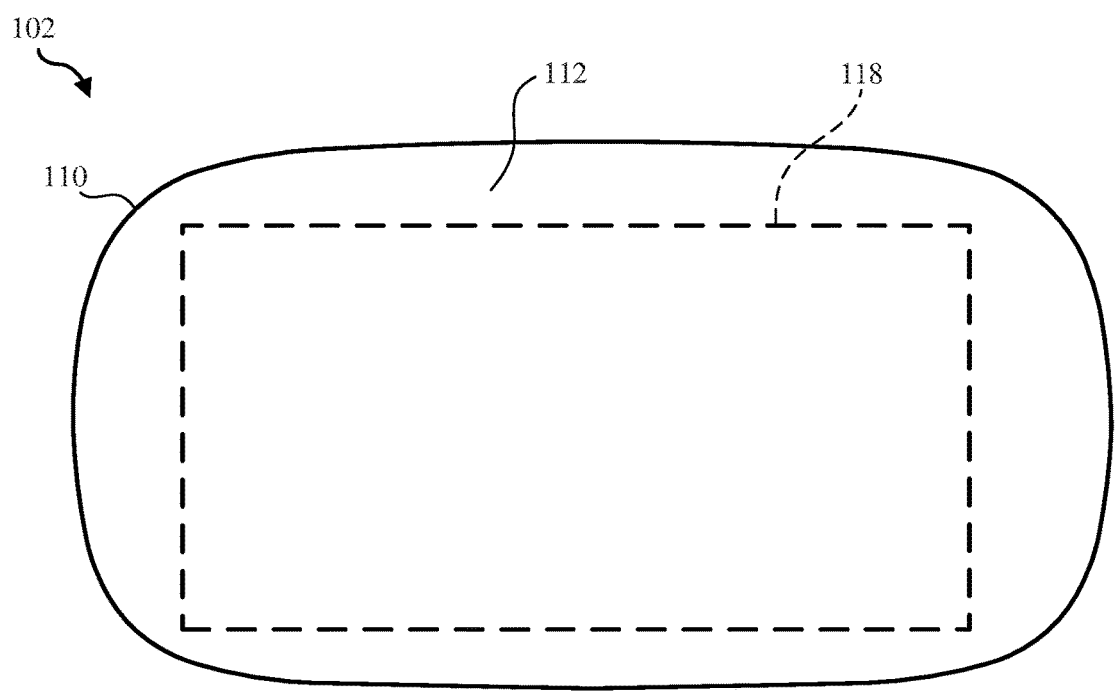
FIG. 2B is a rear view of an exemplary head-mounted-display device in accordance with some embodiments.

FIGS. 2A and 2B respectively show front and rear views of head-mounted-display device 102. Head-mounted-display device 102 may include at least one display screen, such as an LCD display screen, disposed within display housing 110. For example, as shown in FIGS. 2A and 2B, head-mounted-display device 102 may include an LCD screen 118 disposed within display housing 110 so as to overlap lenses 104 such that images produced by a display region of LCD screen 118 are visible to a user through lenses 104. In some embodiments, distinct portions of LCD screen 118 may be visible to each of the user's eyes, with the screen content visible to each eye being separated by a dividing region (e.g., separate eye cups, a central partition, etc.) extending between lenses 104 and LCD screen 118. Such a configuration may enable distinct images to be presented by LCD screen 118 to each of the user's eyes, allowing for 3-dimensional images to perceived by the user. While one LCD screen 118 is illustrated in FIGS. 2A and 2B, in some embodiments, head-mounted-display devices may include multiple LCD screens. For example, a head-mounted-display device may include two LCD screens, with a separate LCD screen being visible to each of a user's left and right eyes.

As shown in FIG. 2A, head-mounted-display device 102 may also include a light-blocking layer 119 surrounding lenses 104. Light-blocking layer 119 may, for example, extend between lenses 104 and surrounding portions of display housing 110. Light-blocking layer 119 may include, for example, a light-absorbing material (e.g., a dark polymeric and/or fabric material) that masks internal components of head-mounted-display device 102 and that prevents any outside light incidentally entering viewing region 106 (e.g., through a gap between the user's face and facial-interface system 108) from being reflected within viewing region 106. Display housing 110 may include a rigid material, such as a rigid plastic, that supports and protects internal components, such as LCD screen 118 and other electronics. At least a portion of display housing 110, such as a portion of display housing 110 surrounding viewing region 106, may include a light-absorbing material that prevents passage of external light and prevents reflection of light incidentally entering viewing region 106. Blocking external light and/or preventing reflection of light in viewing region 106 of head-mounted-display device 102 may greatly enhance a user's immersive viewing experience by ensuring that nearly all light visible to the user is image light emitted from LCD screen 118.

Figure 3:
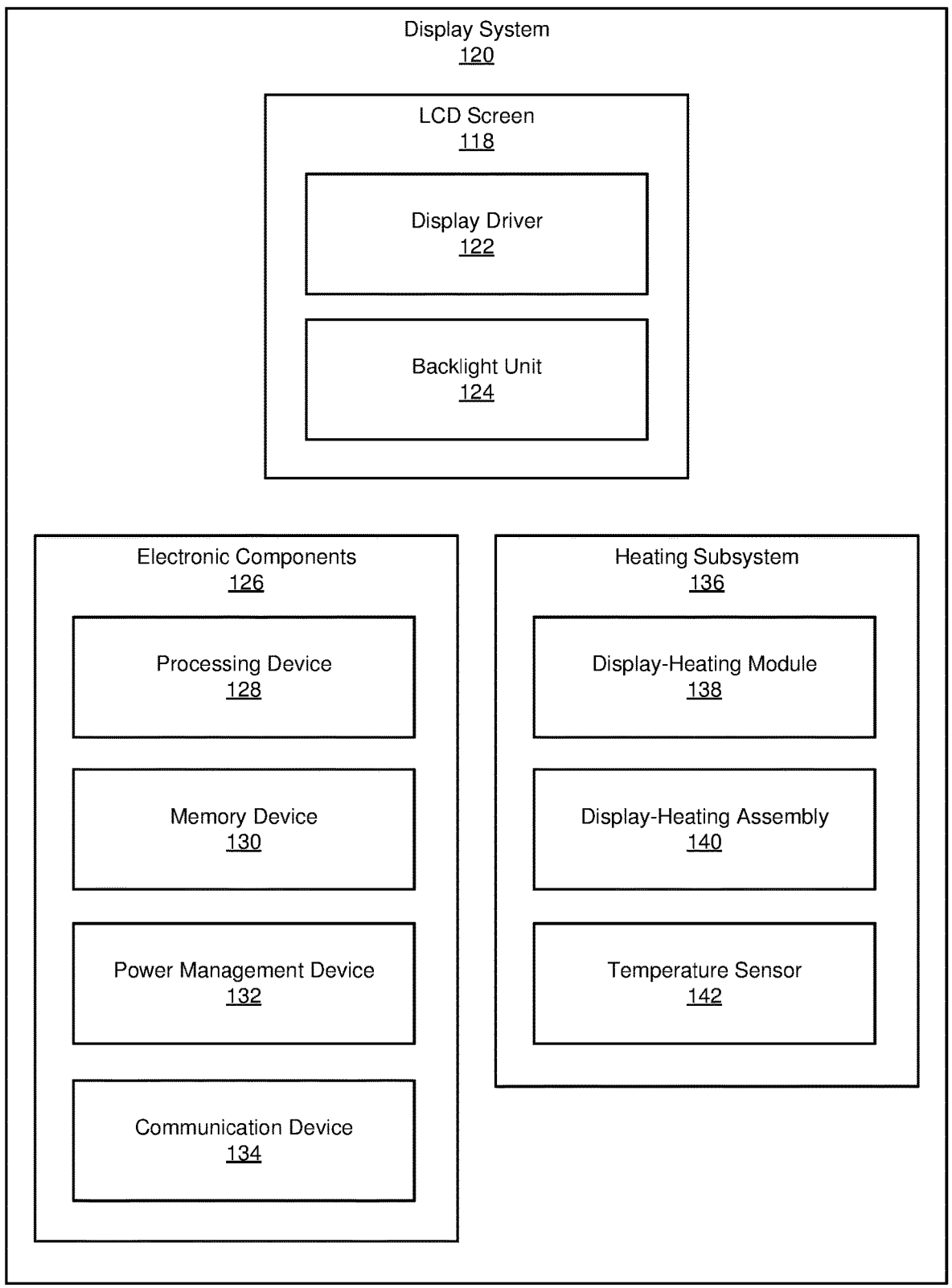
FIG. 3 is a block diagram of an exemplary display system in accordance with some embodiments.

FIG. 3 shows an exemplary display system 120 that includes a heating subsystem for accelerating heating of an LCD screen. Display system 120 may be utilized in head-mounted-display systems (e.g., head-mounted-display system 100 shown in FIG. 1). Additionally or alternatively, display system 120 may be utilized in and/or in conjunction with any suitable electronic display device, such as, for example, a television, a computer monitor, a laptop monitor, a tablet device, a portable device, such as a cellular telephone (e.g., a smartphone), a wrist-watch device, a pendant device or other wearable or miniature device, a media player, a camera viewfinder, a gaming device, a navigation device, and/or any other type of device including an electronic display, without limitation.

As shown in FIG. 3, display system 120 may include LCD screen 118. LCD screen 118 may include a plurality of pixels and subpixels that form visible images according to any suitable display technology. For example, LCD screen 118 may be any suitable type of LCD screen, such as a backlit LCD screen that modulates emitted light through an active matrix liquid crystal pixel array. In some embodiments, display system 120 may include any other suitable type of display screen, such as, for example, an organic light-emitting diode (LED) screen (e.g., an active-matrix OLED screen), a plasma screen, an electrophoretic display screen, an electrowetting display screen, a cathode ray screen, and/or any other suitable image display screen. Light may be emitted from a display surface of LCD screen 118 such that the images are visible to a user. In some examples, images may be produced by driving sub-pixels at different currents and/or voltages such that different amounts of light are emitted from each of the sub-pixels. For example, selected voltages may be applied to sub-pixel regions of a liquid crystal layer to allow passage of various amounts of light. A wide variety visible colors may be produced by combining different amounts of light passed through sub-pixel color regions (e.g., red, green, and/or blue color regions) of a color filter array layer such that a user perceives colors corresponding to the combinations of the sub-pixel colors.

According to at least one embodiment, as shown in FIG. 3, LCD screen 118 of display system 120 may include a display driver 122 for driving sub-pixels of LCD screen 118. Display driver 122 may include any suitable circuitry for driving LCD screen 118. For example, display driver 122 may include at least one display driver integrated circuit (IC). In some examples, display driver 122 may include timing controller (TCON) circuitry that receives commands and/or imaging data and generates horizontal and vertical timing signals for thin-film-transistors (TFTs) of a TFT array of LCD screen 118. Display driver 122 may, for example, be mounted on an edge of a TFT substrate of LCD screen 118 and electrically connected to scan lines and data lines of a TFT sub-pixel array. In some embodiments, LCD screen 118 of display system 120 may also include a backlight unit 124. Backlight unit 124 may include any suitable type of light source that emits light through a liquid crystal display element of LCD screen 118. For example, backlight unit 124 may include an array of light-emitting diodes, an electroluminescent panel, a cold cathode fluorescent lamp, a hot cathode fluorescent lamp, an external electrode fluorescent lamp, and/or an array of laser emitting diodes, without limitation.

According to some embodiments, display system 120 may also include a plurality of electronic components 126. Electronic components 126 may include, for example, electronic components utilized in the operation of LCD screen 118. Additionally or alternatively, electronic components 126 may perform various other functions, such as functions related to display system 120 and/or a device that includes display system 120. For example, electronic components 126 may perform functions related to operations of head-mounted-display device 102 shown in FIGS. 1-2B. In some embodiments, one or more electronic components 126 may carry out functions related to audio subsystems 116 shown in FIG. 1, such as providing audio signals to and/or receiving audio signals from audio subsystems 116. Additionally or alternatively, one or more electronic components 126 may, for example, carry out functions related to 1) tracking the position and orientation of head-mounted-display device 102 and/or one or more controllers (e.g., hand-held controllers) held and operated by a user, 2) performing simultaneous localization and mapping (SLAM) of a user's local area, 3) communicating with one or more devices external to head-mounted-display device 102 (e.g., gaming and/or multimedia consoles or devices, desktops, laptops, tablets, cellular phones, smart phones, wearable devices, embedded systems, internet routers, other head-mounted-display devices, hand-held controllers, etc.), 4) monitoring and/or adjusting temperatures within at least a portion of head-mounted-display device 102, and/or 5) providing haptic feedback to a user.

In some embodiments, electronic components 126 may include one or more physical processing devices, such as processing device 128. Processing device 128 may be, for example, any type or form of physical hardware-implemented processing unit capable of interpreting and/or executing computer-readable instructions. In one example, processing device 128 may access and/or modify one or more instructions stored in memory (e.g., memory device 130). Examples of processing device 128 include, without limitation, microprocessors, microcontrollers, embedded processors, Central Processing Units (CPUs), Field-Programmable Gate Arrays (FPGAs) that implement softcore processors, Application-Specific Integrated Circuits (ASICs), portions of one or more of the same, variations or combinations of one or more of the same, and/or any other suitable physical processor.

Electronic components 126 of display system 120 may also include one or more memory devices, such as memory device 130. Memory device 130 may be, for example, any type or form of volatile or non-volatile storage device or medium capable of storing data and/or computer-readable instructions. In one example, memory device 130 may store, load, and/or maintain computer-readable instructions. Examples of memory device 130 include, without limitation, embedded multimedia cards, Random Access Memory (RAM), Read Only Memory (ROM), flash memory, Hard Disk Drives (HDDs), Solid-State Drives (SSDs), optical disk drives, caches, variations or combinations of one or more of the same, and/or any other suitable storage memory.

In at least one embodiment, electronic components 126 may include one or more power management devices, such as power management device 132. Power management device 132 may include, for example, any type or form of physical device for performing power control functions, such as converting electronic power (e.g., battery power) for use by various components of head-mounted-display system 100. In some examples, power management device 132 may perform functions related to direct current (DC) to DC power conversion, power-source selection, battery and/or capacitor charging, power sequencing, pulse-frequency and/or pulse-width modulation, and/or voltage scanning. Examples of power management device 132 include, without limitation, power management integrated circuits (e.g., PMICs, PMUs, etc.), power management chips, power management system blocks, and/or any other suitable power management device.

According to some embodiments, electronic components 126 may include one or more communication devices, such as communication device 134. Communication device 134 may include, for example, any type or form of physical device for sending and receiving communication signals between head-mounted-display system 100 and one or more external devices and/or between various components of head-mounted-display system 100. In one example, communication device 134 may include one or more antennas and may perform functions related to wireless communications (e.g., WiFi communications, BLUETOOTH communications, cellular communications, mobile satellite communications, etc.) between head-mounted-display system 100 and at least one external computing device (e.g., a gaming and/or multimedia console or device, a desktop, a laptop, a tablet, a cellular phone, a smart phone, a wearable device, an embedded system, an internet router, another head-mounted-display device, a hand-held controller, etc.). Communication device 134 may communicate via a wireless and/or wired connection with external devices either directly or via a suitable network, such as, for example, an intranet, a Wide Area Network (WAN), a Local Area Network (LAN), a low power wide area network (LPWAN) a Personal Area Network (PAN), the Internet, Power Line Communications (PLC), a cellular network (e.g., a Global System for Mobile Communications (GSM) network), portions of one or more of the same, variations or combinations of one or more of the same, and/or any other suitable network. Examples of communication device 134 include, without limitation, WiFi and/or BLUETOOTH chipsets, WiFi and/or BLUETOOTH microcontrollers, and/or any other suitable communication device.

Display system 120 may also include a heating subsystem 136 for heating LCD screen 118 according to one or more of the embodiments described herein. Heating subsystem 136 may include a display-heating module 138, a display-heating assembly 140, and/or a temperature sensor 142, as shown in FIG. 3. Display-heating module 138 may control and/or interface with one or more components of heating subsystem 136 and/or other components of display system 120 for purposes of heating LCD screen 118. Display-heating assembly 140 may be any suitable assembly for heating LCD screen 118 as described herein. One or more temperature sensors, such as temperature sensor 142, may be included in heating subsystem 136 to measure temperatures at one or more locations within a display device (e.g., head-mounted-display device 102) that includes LCD screen 118.

In certain embodiments, display-heating module 138 of heating subsystem 136 may represent one or more software applications or programs that, when executed by a computing device, may cause the computing device to perform one or more tasks. For example, and as will be described in greater detail below, display-heating module 138 may represent a module stored and configured to run on a display device (e.g., head-mounted-display device 102) and/or one or more computing devices external to the display device. In one example, one more memory devices of the display device (e.g., memory device 130) and/or one or more memory devices external to the display device may store, load, and/or maintain display-heating module.

Figure 4:
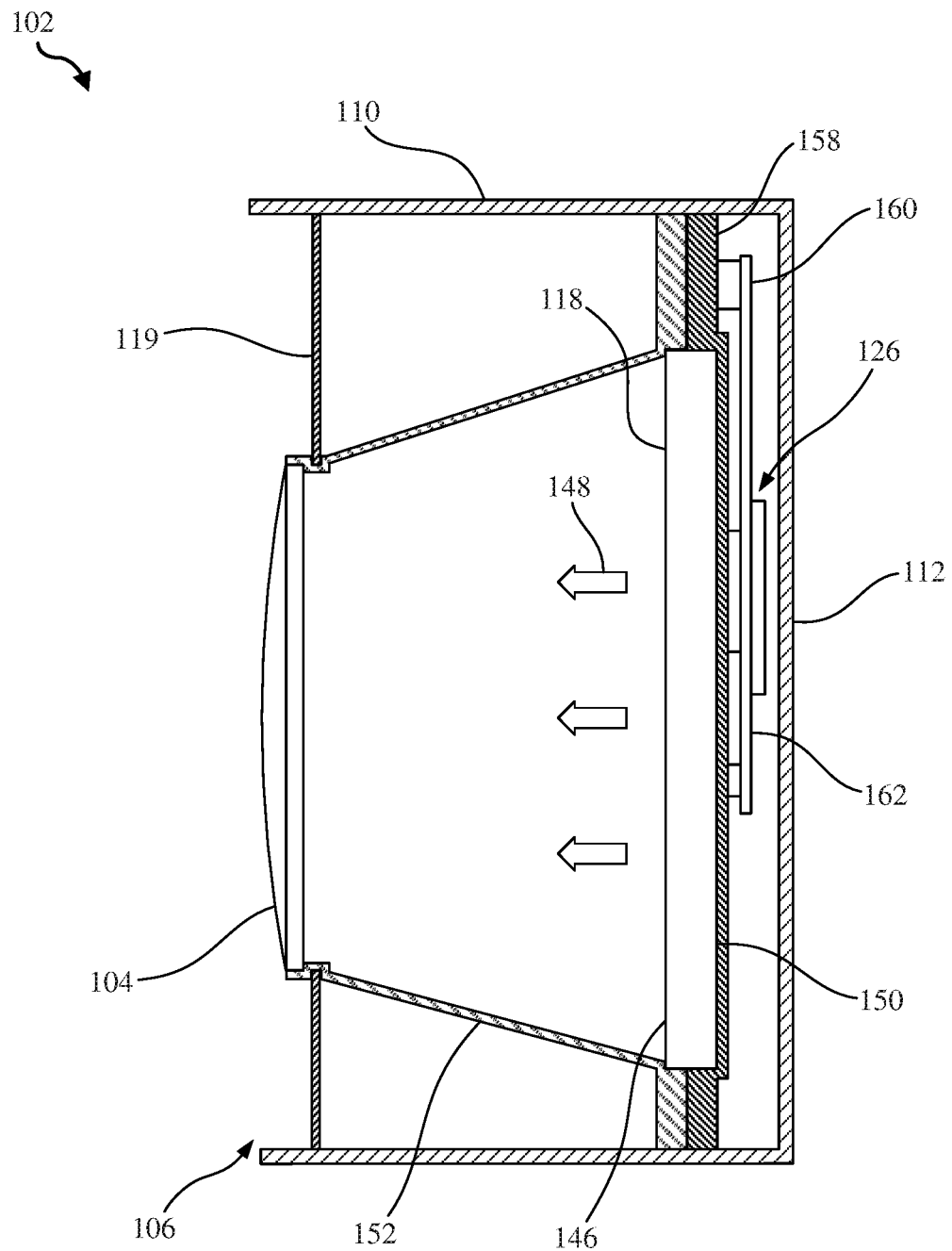
FIG. 4 is a partial cross-sectional side view of an exemplary head-mounted-display device in accordance with some embodiments.

FIG. 4 shows an exemplary partial cross-sectional side view of head-mounted-display device 102. As shown in this figure, LCD screen 118 may be disposed within display housing 110 of head-mounted-display device 102. According to some embodiments, each lens 104 may be mounted to a lens fixture 152, which may extend between lens 104 and a corresponding portion of LCD screen 118. In some embodiments, lens fixture 152 may surround a viewing path between lens 104 and LCD screen 118. LCD screen 118 may be positioned and oriented in display housing 110 such that a front surface 146 of LCD screen 118 faces towards lenses 104. As such, image light 148 emitted from front surface 146 of LCD screen 118 may be visible to a user through lenses 104.

According to at least one embodiment, a rear surface 150 of LCD screen 118 may be disposed adjacent to a support member 158. For example, as shown in FIG. 4, at least a portion of LCD screen 118 may be disposed between support member 158 and lens fixture 152. In some embodiments, LCD screen 118 may be disposed within a recessed portion of support member 158 such that LCD screen 118 is secured within support member 158 and/or between support member 158 and lens fixture 152.

In certain embodiments, one or more electronic components, such as electronic components 126 shown in FIG. 3, may be located near at least a portion of LCD screen 118. For example, as shown in FIG. 4, at least one electronic component 126 may be located near and/or adjacent to rear surface 150 of LCD screen 118 in a portion of head-mounted-display device 102 between LCD screen 118 and housing back surface 112. In at least one example, the at least one electronic component 126 may be mounted to a printed circuit board substrate 162 as part of a printed circuit board assembly 160 that is located near and/or adjacent to rear surface 150 of LCD screen 118. In some embodiments, LCD screen 118 may be separated from printed circuit board assembly 160 by at least a portion of support member 158. Additionally or alternatively, one or more openings may be defined in support member 158 in a region between LCD screen 118 and printed circuit board assembly 160.

Figure 5:
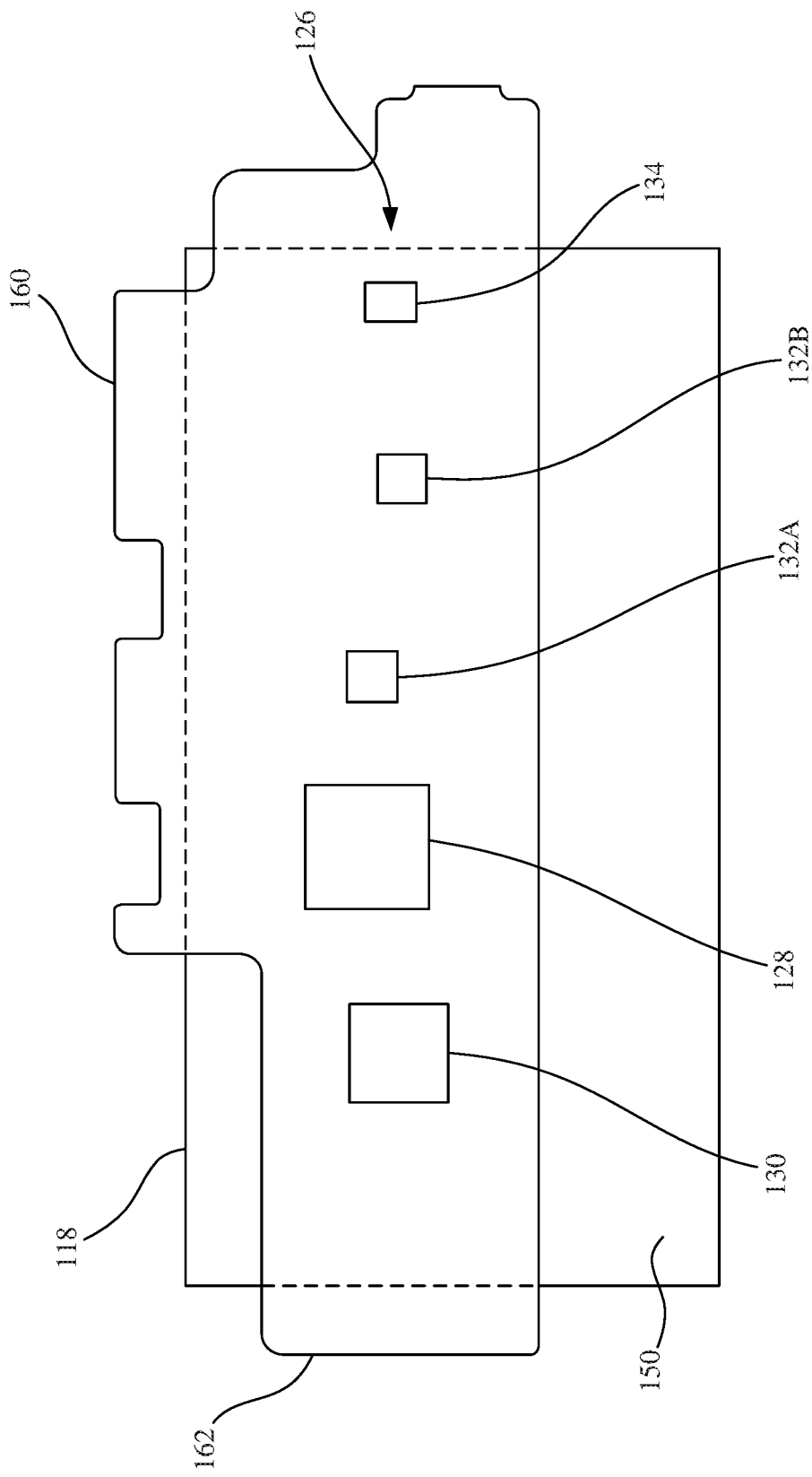
FIG. 5 is a rear view of an exemplary LCD screen and printed circuit board in accordance with some embodiments.

FIG. 5 illustrates a rear view of an exemplary printed circuit board assembly 160 overlapping LCD screen 118 (support member 158 disposed between printed circuit board assembly 160 and LCD screen 118 is not illustrated in FIG. 5). As shown in FIG. 5, at least a portion of printed circuit board assembly 160 may overlap at least a portion of LCD screen 118 such that one or more electronic components 126 of printed circuit board assembly 160 directly overlap, for example, rear surface 150 of LCD screen 118. In some embodiments, electronic components 126 may be disposed on a plurality of printed circuit boards. Printed circuit board assembly 160 may include any suitable electronic components disposed in any suitable configuration, without limitation.

In some embodiments, as shown in FIG. 5, electronic components 126 of printed circuit board assembly 160 may include a processing device 128, a memory device 130, at least one power management device 132 (e.g., power management device 132A and power management device 132B), and a communication device 134. One or more of processing device 128, memory device 130, power management device 132A, power management device 132B, and communication device 134 may overlap at least a portion of LCD screen 118, such as rear surface 150. According to at least one embodiment, processing device 128, memory device 130, power management device 132A, power management device 132B, and/or communication device 134 may be utilized during operation of head-mounted-display device 102 by a user.

According to at least one embodiment, when head-mounted-display device 102 is turned on and operated by a user, one or more electronic components 126 of printed circuit board assembly 160 may generate heat, at least a portion of which may be transferred to LCD screen 118 (via, for example, conduction, convection, and/or radiation). Additionally, at least a portion of LCD screen 118 (e.g., display driver 122, a TFT array, a backlight unit, etc.) may generate heat within LCD screen 118 (see, e.g., FIG. 8A). Accordingly, when head-mounted-display device 102 is operated by a user, LCD screen 118 may be heatable at a base heating rate by operation of LCD screen 118 and one or more of electronic components 126. In some examples, when head-mounted-display device 102 is initially started, LCD screen 118 may be heatable from an initial temperature to a raised temperature by the operation (e.g., normal or standard operation) of LCD screen 118 and one or more of electronic components 126. For example, LCD screen 118 may be heated at the base heating rate or a range of base heating rates following startup, or following a low-power use state, such as a sleep, standby, or hibernate mode, and for a period of time thereafter. LCD screen 118 may be heated at the base heating rate or a range of base heating rates by operation of LCD screen 118 and electronic components 126 as head-mounted-display device 102 is operated by a user. LCD screen 118 may be heated for the period of time until it reaches a steady-state temperature or range of temperatures, at which time the temperature of LCD screen 118 no longer rises and/or fluctuates minimally around the steady-state temperature or within the range of steady-state temperatures. In some embodiments, the base heating rate or range of base heating rates may vary based on the user's particular use of head-mounted-display device 102 and/or various other factors affecting operating speeds and/or power usage of one or more of electronic components 126 and/or LCD screen 118. Additionally or alternatively, the base heating rate or range of base heating rates may vary based on a temperature of head-mounted-display device 102 and/or a temperature of a local area surrounding head-mounted-display device 102.

In some embodiments, heating subsystem 136 may accelerate a heating rate of LCD screen 118 above the base heating rate or range of base heating rates, thereby shortening a period of time required to heat LCD screen 118 from an initial temperature to a raised temperature above the initial temperature. For example, when LCD screen 118 is determined to be below a minimum threshold screen temperature, heating subsystem 136 may accelerate the heating rate of LCD screen 118 in order to more quickly increase the temperature of LCD screen 118 above the minimum threshold screen temperature and/or above another selected threshold temperature that is greater than the minimum threshold screen temperature. In some examples, once LCD screen 118 has been heated at the accelerated heating rate for a selected period of time and/or once LCD screen 118 has reached at least a selected target or threshold temperature, heating subsystem 136 may end heating of LCD screen 118 at the accelerated heating rate.

In some embodiments, heating subsystem 136 may be utilized periodically as needed to accelerate the heating rate of LCD screen 118 when, for example, LCD screen 118 drops below the minimum threshold screen temperature. Additionally or alternatively, accelerated heating of LCD screen 118 by heating subsystem 136 may be carried out immediately following initial startup of head-mounted-display device 102, or when head-mounted-display device 102 is brought out of a low-power state (e.g., a sleep mode, a standby mode, hibernate mode, etc.), as subsequent operation of electronic components 126 and/or LCD screen 118 may provide sufficient heat to maintain LCD screen 118 at temperatures above the minimum threshold temperature. By heating LCD screen 118 at the accelerated heating rate, heating subsystem 136 may reduce or eliminate a period of time (e.g., a startup period) during which colder temperatures may cause image defects or inconsistencies, such as blurred lines and/or double images. Heating subsystem 136 may accelerate the heating rate of LCD screen 118 in any suitable manner, as described herein.

According to some embodiments, heating subsystem 136 may be utilized to accelerate heating of LCD screen 118 when an initial temperature detected by a temperature sensor (e.g., temperature sensor 142 shown in FIG. 3) is determined to be below a predetermined minimum threshold temperature. For example, a temperature detected in at least a portion of head-mounted-display device 102, such as a temperature detected at or near LCD screen 118 and/or any other suitable location within head-mounted-display device 102, and/or when a temperature detected in a local area of head-mounted-display device 102 may be determined to be below a predetermined minimum threshold temperature (e.g., a minimum threshold screen temperature and/or a minimum threshold sensor temperature). The minimum threshold temperature may be a temperature at or below which image defects, such as blurred images and/or double images, may occur and/or may be readily apparent to a user. For example, the minimum threshold temperature may a temperature at or below 25° C. In some embodiments, the minimum threshold temperature may be a temperature between about 10° C. and about 25° C. (e.g., about 10° C. or less, about 15° C., about 15° C., about 15° C.). When the detected temperature is below the minimum threshold temperature, heating subsystem 136 may accelerate heating of LCD screen 118 for a specified period of time (i.e., an accelerated heating time period) and/or until LCD screen 118 is determined to be above the minimum threshold temperature or above another selected threshold temperature that is greater than the minimum threshold temperature. The accelerated heating time period may be a single set time period and/or may be a time period that is selected based on the initial detected temperature. In some embodiments, heating subsystem 136 may accelerate heating of LCD screen 118 automatically when head-mounted-display device 102 is turned on and/or is operated following a low-power state. For example, heating subsystem 136 may accelerate heating of LCD screen 118 at startup or after a low-power state without first determining an initial temperature.

According to at least one embodiment, display-heating module 138 of heating subsystem 136 shown in FIG. 3 may increase an operating speed of at least one of electronic components 126 to generate additional heat at the at least one electronic component. For example, display-heating module 138 may increase an operating speed of at least one of processing device 128, memory device 130, power management device 132A, power management device 132B, and communication device 134 shown in FIG. 5, and/or other electronic components of head-mounted-display device 102, above a current operating speed or range of operating speeds of the at least one component. Display-heating module 138 may increase the operating speed of the at least one of electronic components 126 in any suitable manner.

In some embodiments, display-heating module 138 may in increase the operating speed of the at least one of electronic components 126 by providing superfluous commands to the at least one of electronic components 126. For example, display-heating module 138 may create a dummy or phantom computing need to further drive and/or overdrive the at least one of electronic components 126 by sending the superfluous commands to the at least one of electronic components 126. The superfluous commands may be commands that are not be related to functional requirements of head-mounted-display device 102, aside from generating additional heat in the at least one of electronic components 126 for accelerating heating of LCD screen 118. In response to the superfluous commands, the at least one of electronic components 126 may operate at a higher speed and/or utilize a greater amount of power, generating additional heat in the process.

In some examples, the superfluous commands provided by display-heating module 138 to the at least one of electronic components 126 may be selected to generate a suitable amount of additional heat in the at least one of electronic components 126, while not degrading performance of the at least one of electronic components 126 to a degree that noticeably or significantly impacts operational functionality of head-mounted-display device 102. For example, display-heating module 138 may increase a computing load on the at least one of electronic components 126 to generate additional heat for accelerating heating of LCD screen 118 while ensuring that the at least one of electronic components 126 has sufficient resources available to operate head-mounted-display device 102 in a desired manner. Accordingly, during accelerated heating of LCD screen 118, a decrease in performance of head-mounted-display device 102 may be minimal or unnoticeable to a user.

According to at least one embodiment, heat generated at the at least one of electronic components 126 may be transferred to LCD screen 118, which may be in close proximity to and/or adjacent to the at least one of electronic components 126. For example, as shown in FIG. 5, processing device 128, memory device 130, power management device 132A, power management device 132B, and/or communication device 134 of printed circuit board assembly 160, which is disposed in close proximity to rear surface 150 of LCD screen 118, may overlap portions of LCD screen 118. Accordingly, heat generated at processing device 128, memory device 130, power management device 132A, power management device 132B, and/or communication device 134, and/or at other portions of printed circuit board assembly 160, may be readily transferred directly to LCD screen 118 and/or may be transferred to LCD screen 118 via an intermediary material (e.g., support member 158 shown in FIG. 4). In at least one example, one or more thermally conductive materials may also be disposed between printed circuit board assembly 160 and LCD screen 118 to facilitate transfer of heat from at least one of electronic components 126 and at least a portion of LCD screen 118 and/or to spread heat from at least one of electronic components 126 and at least a portion of LCD screen 118 over a greater region of LCD screen 118.

Figure 6:
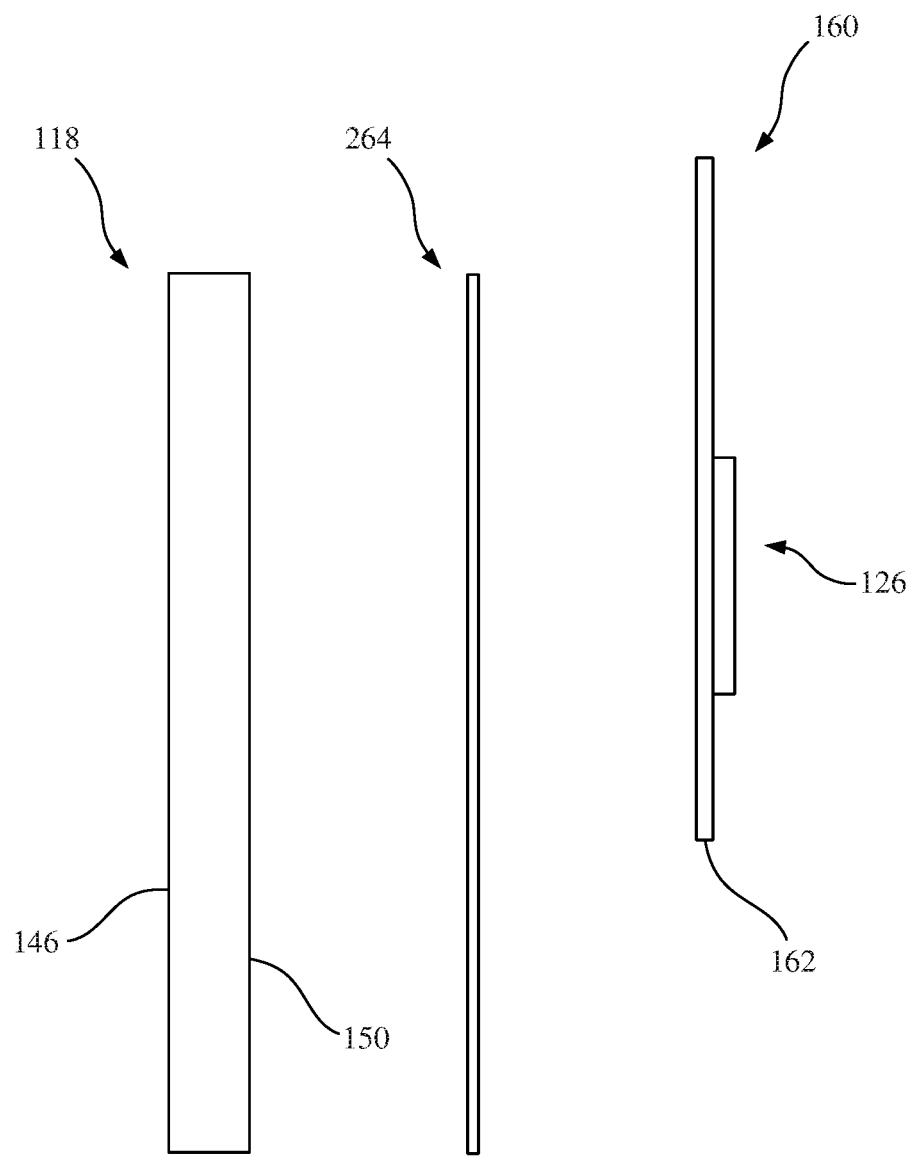
FIG. 6 is a side view of an exemplary LCD screen, printed circuit board, and thermally conductive layer in accordance with some embodiments.

FIG. 6 illustrates an intermediate layer disposed between LCD screen 118 and printed circuit board assembly 160 in accordance with some embodiments. In at least one embodiment, display-heating assembly 140 of heating subsystem 136 may include a thermally conductive layer 264 for facilitating transfer of heat to LCD screen 118. As shown in FIG. 6, for example, thermally conductive layer 264 may be disposed between LCD screen 118 and printed circuit board assembly 160. Thermally conductive layer 264 may be disposed at any suitable location between printed circuit board assembly 160 and LCD screen 118. For example, thermally conductive layer 264 may be disposed adjacent to and/or abutting printed circuit board assembly 160 and/or LCD screen 118 (e.g., adjacent to and/or abutting rear surface 150 of LCD screen 118). In at least one example, thermally conductive layer 264 may be disposed between support member 158 and LCD screen 118 and/or may be disposed between support member 158 and printed circuit board assembly 160. Additionally or alternatively, an opening may be defined in support member 158 and/or head-mounted-display device 102 may not include support member 158, such that thermally conductive layer 264 is directly disposed between LCD screen 118 and printed circuit board assembly 160.

In some embodiments, thermally conductive layer 264 may include a thermally conductive material that facilitates conduction of heat from at least a portion of printed circuit board assembly 160 to LCD screen 118. In at least one example, thermally conductive layer 264 may act as a heat spreader that conducts and spreads heat from regions of printed circuit board assembly 160 (e.g., regions corresponding to processing device 128, memory device 130, power management device 132A, power management device 132B, and/or communication device 134 shown in FIG. 5) over a broader area. For example, thermally conductive layer 264 may be dimensioned to extend over at least a portion of or entirely over rear surface 150 of LCD screen 118. In some examples, thermally conductive layer 264 may additionally or alternatively overlap at least a portion of one or more side surfaces of LCD screen 118 extending between rear surface 150 and front surface 146. Heat transferred from one or more regions of printed circuit board assembly 160 may be conducted and spread outward by thermally conductive layer 264 from portions of thermally conductive layer 264 overlapping the one or more regions of printed circuit board assembly 160. Accordingly, as opposed to transmitting heat directly to portions of LCD screen 118 overlapping elevated temperature regions of printed circuit board assembly 160 (e.g., high heat flux regions of printed circuit board assembly 160), thermally conductive layer 264 may spread and transfer heat more evenly to a broader portion of LCD screen 118, allowing for more even and consistent heating of LCD screen 118.

Thermally conductive layer 264 may include any suitable material for conducting and/or spreading heat, such as a material having a high thermal conductivity. For example, thermally conductive layer 264 may include a metal material (e.g., copper, aluminum, molybdenum, magnesium, tungsten, alloyed and/or sintered materials thereof, etc.), a metalloid material (e.g., silicon, germanium, etc.), a graphene material (e.g., graphite, pyrolytic graphite, graphite-polymer composite, etc.), a diamond material (chemical vapor deposition diamond, SUMICRYSTAL diamond, copper diamond, etc.), a ceramic material (e.g., aluminum nitride, aluminum-silicon carbide, etc.), and/or a polymer material (thermally conductive polyester, acrylic, nylon, polypropylene, polysulfone, polycarbonate, liquid crystal polymer, polyphenylene sulfide, polyether ether ketone, acrylonitrile butadiene styrene, polybutylene terephthalate, polyphthalamide, themoplastic elastomer, etc.).

Figure 7:
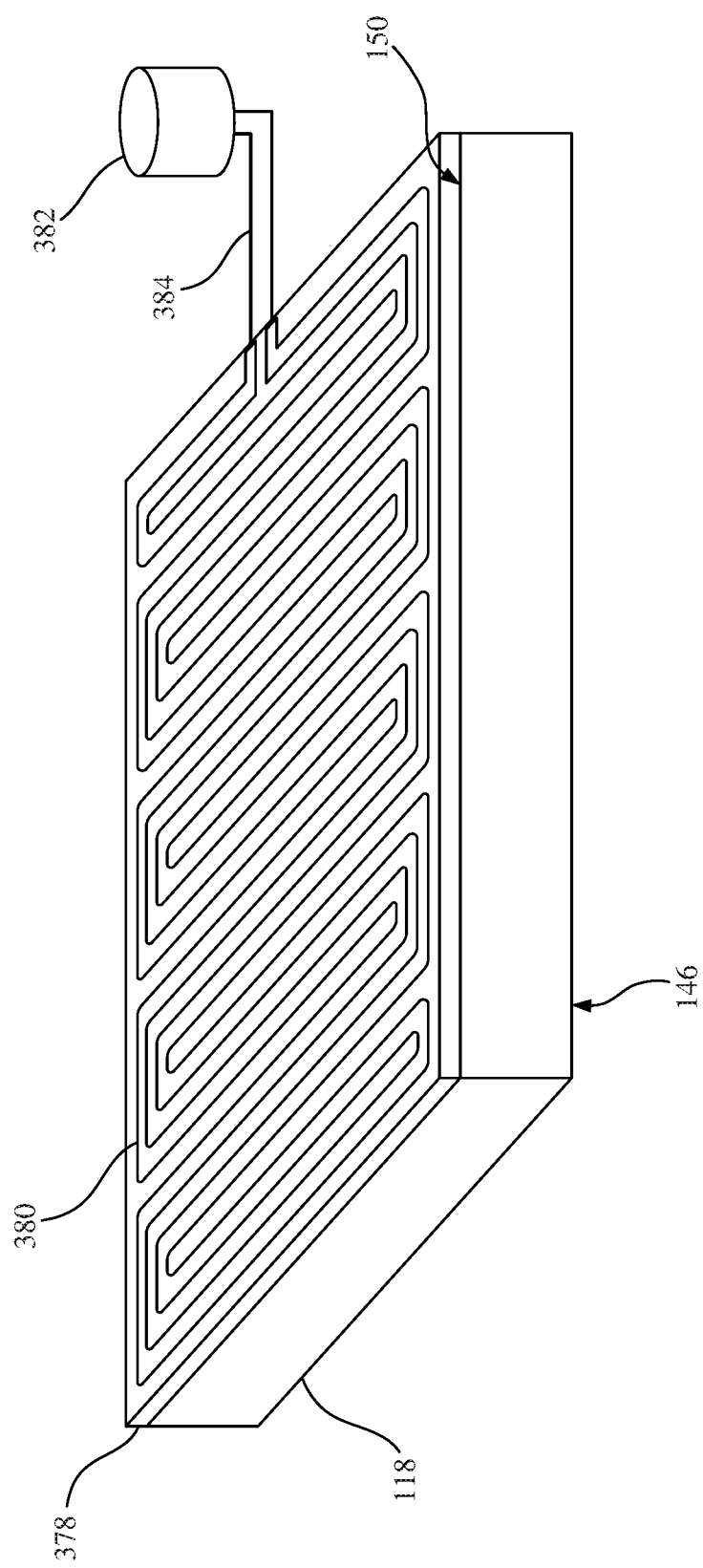
FIG. 7 is a perspective view of an exemplary LCD screen and heating film in accordance with some embodiments.

FIG. 7 illustrates a heating element disposed adjacent to LCD screen 118 in accordance with some embodiments. In at least one embodiment, a heating element, such as a heating element 380 of a heating film 378 shown in FIG. 7, may be disposed adjacent to and/or abutting at least a portion of LCD screen 118. For example, heating film 378 may be disposed adjacent to and/or abutting at least a portion of rear surface 150 of LCD screen 118. Heating film 378 may be any suitable heating film for heating at least a portion of LCD screen 118. In at least one example, heating film 378 may include a heating element 380 disposed on a film layer (e.g., a polymeric film layer, such as polyimide film layer) and/or between two or more film layers. In some examples, heating film 378 may include an etched layer, such as an etched silicon foil layer, disposed on a film layer. Heating film 378 may include any pattern suitable for evenly heating and distributing heat across at least a surface portion of LCD screen 118. Any other suitable type of heater and/or heating element may be utilized to heat at least a portion of LCD screen 118, such as portions of rear surface 150 and/or side portions LCD of screen 118 extending between rear surface 150 and front surface 146.

In at least one embodiment, display-heating module 138 of heating subsystem 136 may accelerate heating of rear surface 150 using heating film 378. For example, display-heating module 138 may control a power source of head-mounted-display device 102 to apply an electrical current to heating element 380 of heating film 378. Any suitable power source may be utilized to apply the electrical current to heating element 380, such as, for example, a capacitor, a battery (e.g., a rechargeable battery), and/or a hard-wired power source. In some embodiments, head-mounted-display device 102 may include a capacitor 382 that is electrically connected to heating element 380 via wiring 384. Capacitor 382 may be any suitable type of capacitor that stores a charge sufficient for heating LCD screen 118 via heating element 380. For example, capacitor 382 may be a supercapacitor (e.g., an electric double-layer capacitor, an ultracapacitor, a pseudocapacitor, a hybrid capacitor etc.) that stores an electric charge. In some embodiments, capacitor 382 may be capable of discharging more rapidly than a conventional battery of similar size and/or storage capacity. Thus, capacitor 382 may deliver power to heating element 380 of heating film 378 in a relatively short period of time, allowing for rapid heating of LCD screen 118 by heating element 380. In at least one embodiment, display-heating module 138 of heating subsystem 136 may initiate delivery of power by capacitor 382 to heating element 380 when head-mounted-display device 102 is turned on and/or brought out of a low-power state and/or when a temperature of LCD screen 118 and/or head-mounted-display device 102 is determined to be below a specified threshold temperature. Following heating of LCD screen 118 by heating element 380, capacitor 382 may be recharged by head-mounted-display device 102 (e.g., by a battery and/or other power source of head-mounted-display device 102) during operation of head-mounted-display device 102.

Figure 8A:
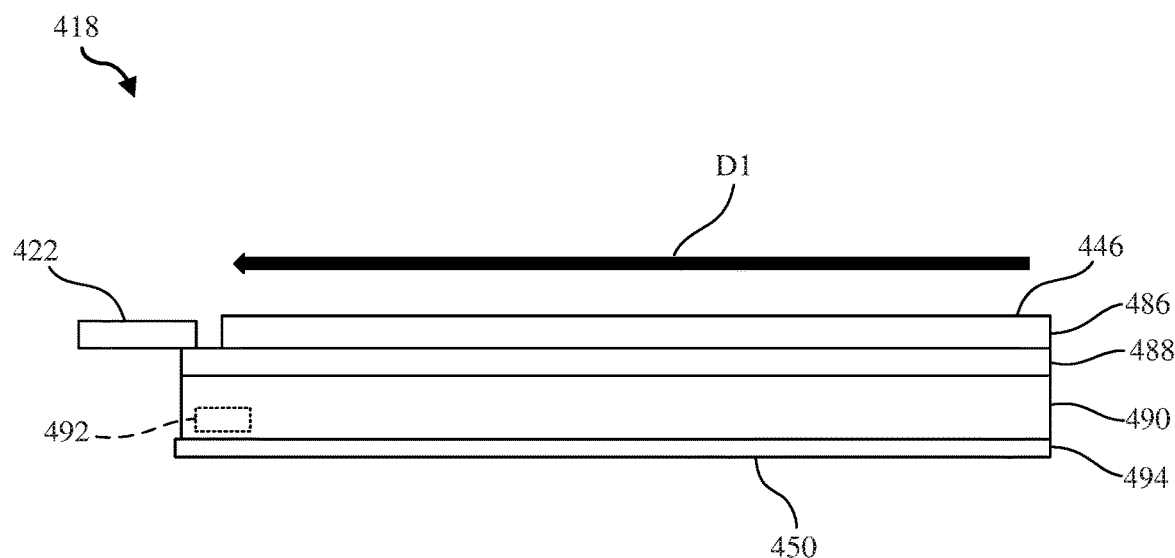
FIG. 8A is a side view of an exemplary LCD screen in accordance with some embodiments.

FIG. 8A illustrates an LCD screen 418 that may be utilized in head-mounted-display device 102 and/or display system 120 in accordance with some embodiments. As shown in this figure, LCD screen 418 may include a liquid crystal element 486, a TFT array substrate 488, and a rear cover 494. A display driver 422 may be electrically coupled to TFT array substrate 488 to drive TFT array substrate 488 for operating liquid crystal sub-pixel elements of liquid crystal element 486. In at least one example, display driver 422 may be a driving integrated circuit that receives commands and/or imaging data from other components (e.g., processing device 128, memory device 130, etc.) of head-mounted-display device 102 and generates corresponding imaging signals that are sent to TFT array substrate 488. In some examples, display driver 422 may include TCON circuitry that receives commands and/or imaging data and generates horizontal and vertical timing signals for TFTs of TFT array substrate 488.

Backlight unit 490 may include an LED array 492 (e.g., an LED bar) that enables backlight unit 490 to function as a scanning backlight unit. Backlight unit 490 may additionally include features for directing light from LED array 492 toward portions of TFT array substrate 488 and liquid crystal element 486, such as a light guide, a diffuser, a brightness enhancement film, and/or any other suitable lighting elements. Rear cover 494 forming rear surface 450 may include a material that reflects light from LED array 492 toward liquid crystal element 486, such as, for example, a reflective metal material and/or any other suitable material. LED array 492 may be driven by backlight scanning signals from display driver 422 and/or from another driver (e.g., a backlight driver integrated circuit) of LCD screen 418 and/or head-mounted-display device 102.

In some examples, images may be produced by driving, via TFTs of TFT array substrate 488, sub-pixel regions of liquid crystal element 486 at different currents and/or voltages in coordination with emission of light by LEDs of LED array 492 such that selected amounts of light are passed through each of the sub-pixel regions. Liquid crystal element 486 may include a color filter array layer having various color filter regions (e.g., red, green, and blue regions) corresponding to each of the plurality of sub-pixel regions of liquid crystal element 486. A front layer (e.g., a glass layer or other light-transmissive layer) of liquid crystal element 486 forming front surface 446 of liquid crystal element 486 may protect components of liquid crystal element 486.

In at least one embodiment, display-heating module 138 of heating subsystem 136 may drive at least a portion of LCD screen 418 while an image is not displayed by LCD screen 418. For example, display-heating module 138 may send scanning data and/or commands to display driver 422 and/or LED array 492, causing display driver 422 and/or LED array 492 to operate when an image is not displayed by LCD screen 418. In some examples, display-heating module 138 may initiate operation of display driver 422 and/or LED array 492 when head-mounted-display device 102 is turned on and/or brought out of a low-power state and/or when a temperature of LCD screen 418 and/or head-mounted-display device 102 is determined to be below a specified threshold temperature. In some embodiments, display-heating module 138 of heating subsystem 136 may additionally or alternatively drive one or more other electronic components of head-mounted-display device 102, such as at least one of electronic components 126, while an image is not displayed by LCD screen 418.

Figure 8B:
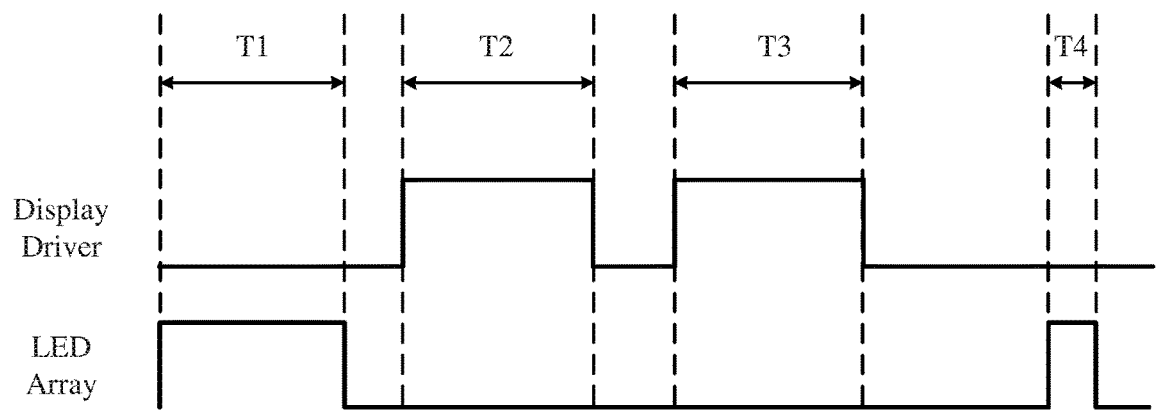
FIG. 8B is a timing diagram illustrating exemplary signals provided to an LCD screen in accordance with some embodiments.

FIG. 8B is an exemplary diagram showing timings of signals sent to LED array 492 and commands and/or image data sent to display driver 422 prior to displaying images on LCD screen 418. In at least one embodiment, prior to sending a display ON signal to LED array 492 at time T4, scanning data may be sent to LED array 492 and/or display driver 422. For example, pre-scan signals (i.e., scanning signals not used for generating images on LCD screen 418) may be sent to LED array 492 and commands and/or data may be sent to display driver 422 for applying pre-scan signals to TFT array substrate 488. In at least one embodiment, as shown in FIG. 8B, at time T1, display-heating module 138 of heating subsystem 136 may cause pre-scan signals to be applied to LEDs of LED array 492. The pre-scan signals applied to the LEDs of LED array 492 may cause the LEDs to be sequentially illuminated, resulting in generation of heat at LED array 492. In some examples, during time T1, sub-pixel regions of liquid crystal element 486 and corresponding TFTs of TFT array substrate 488 may be in an OFF configuration such that light emitted by LEDs of LED array 492 is prevented or inhibited from passing through liquid crystal element 486. LEDs of LED array 492 may be illuminated for any suitable length of time and/or any suitable number of times. Subsequently, at time T2 shown in FIG. 8B, commands and/or data (e.g., initial display setting data) may be sent to display driver 422 by display-heating module 138 of heating subsystem 136. Then, at time T3, display driver 422 may generate and send pre-scan signals corresponding to the initial display setting data to TFTs of TFT array substrate 488. Application of pre-scan signals by display driver 422 to TFT array substrate 488 may be repeated any suitable number of times and/or for any suitable length of time. During time T2 and time T3, operation of display driver 422 may cause generation of heat at display driver 422 and/or TFT array substrate 488. During time T2 and time T3, signals may not be applied to LED array 492 such that light is not emitted by LEDs of LED array 492. Accordingly, images may not be visible to a user viewing LCD screen 418 prior to time T4.

The heat generated in LED array 492, display driver 422, and/or TFT array substrate 488 may result in heating of portions of LCD screen 418, including regions of liquid crystal element 486. In some examples, a greater amount of heat may be generated at a side portion of LCD screen 418 that includes LED array 492 and display driver 422. In at least one example, a conductive layer (e.g., thermally conductive layer 264 shown in FIG. 6) disposed near and/or adjacent to rear surface 450 of rear cover 494 may facilitate transfer of heat from LED array 492 and/or display driver 422 to other portions of LCD screen 418. Accordingly, pre-scanning of LEDs of LED array 492 may accelerate heating of LCD screen 418 prior to displaying images on LCD screen 418. In at least one embodiment, display-heating module 138 of heating subsystem 136 may initiate heating of LED array 492 and/or display driver 422 in this manner to accelerate heating of LCD screen 418 when head-mounted-display device 102 is turned on and/or brought out of a low-power state and/or when a temperature of LCD screen 118 and/or head-mounted-display device 102 is determined to be below a specified threshold temperature.

In some embodiments, during operation of LCD screen 418 to display images, scanning signals may be sent by display driver 422 to one or more rows of TFTs of TFT array substrate 488 during discrete scanning periods, with the scanning signals being sequentially sent along the one or more rows of TFTs of display driver 422 in a particular direction, prior to lighting an LED of LED array 492 corresponding to the one or more rows immediately following each scanning period. The scanning signals may set liquid crystal states (i.e., orientations of the liquid crystals in response to applied voltages) of sub-pixels of liquid crystal element 486 corresponding to the one or more rows of TFTs of display driver 422. Because sub-pixels of liquid crystal element 486 corresponding to TFTs of display driver 422 that receive scanning signals toward the end of the scanning period have less time to change their liquid crystal states than other sub-pixels of liquid crystal element 486, image inconsistencies, such as blurring and/or double images, may be more readily apparent to a user in sub-pixel regions corresponding to the end of such scanning periods. Increased latencies of sub-pixels of liquid crystal element 486 due to lower temperatures in LCD screen 418 may increase the occurrence of such inconsistencies. In some embodiments, a scanning direction may be selected to ensure that TFTs of TFT array substrate 488 that receive scanning signals toward the end of the scanning periods are located closest to LED array 492 and/or display driver 422, ensuring that these TFTs and corresponding sub-pixel elements of liquid crystal element 486 are heated at a greater heating rate by LED array 492 and/or display driver 422. For example, scanning signals may be sent by display driver 422 to TFTs of TFT array substrate 488 in direction D1 shown in FIG. 8A such that TFTs of TFT array substrate 488 closest to display driver 422 and LED array 492 receive scanning signals toward the end of the scanning periods, thereby reducing and/or eliminating the appearance of image inconsistencies to a user viewing LCD screen 418.

Figure 9:
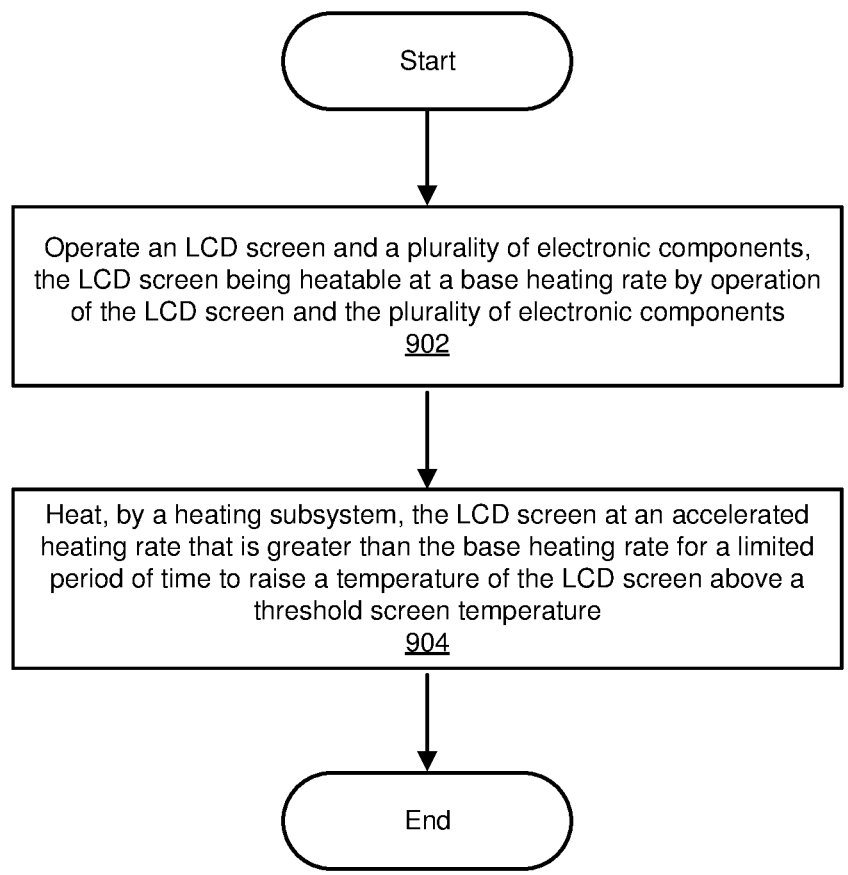
FIG. 9 is a flow diagram of an exemplary method for heating an LCD screen in accordance with some embodiments.

FIG. 9 is a flow diagram of an exemplary computer-implemented method 900 for heating an LCD screen. The steps shown in FIG. 9 may be performed by any suitable computer-executable code, computing system, and/or heating assembly, including, for example, display subsystem 120 in FIG. 3. In one example, at least a portion of one or more of the steps shown in FIG. 9 may represent an algorithm whose structure includes and/or is represented by multiple sub-steps, examples of which will be provided in greater detail below.

As illustrated in FIG. 9, at step 902 one or more of the systems and/or apparatuses described herein may operate an LCD screen and a plurality of electronic components. The LCD screen may be heatable at a base heating rate by operation of the LCD screen and the plurality of electronic components. For example, head-mounted-display device 102 may operate LCD screen 118 and a plurality of electronic components 126 (see, e.g., FIGS. 1-7; see also FIGS. 8A and 8B). LCD screen 118 may be heatable at a base heating rate by operation of LCD screen 118 and the plurality of electronic components 126.

At step 904 in FIG. 9, one or more of the systems and/or apparatuses described herein may heat the LCD screen at an accelerated heating rate that is greater than the base heating rate for a limited period of time to raise a temperature of the LCD screen above a threshold screen temperature. For example, display-heating module 138 and/or display-heating assembly 140 may heat the LCD screen at an accelerated heating rate that is greater than the base heating rate for a limited period of time to raise a temperature of LCD screen 118 above a threshold screen temperature (see, e.g., FIGS. 4-7; see also FIGS. 8A and 8B).

As discussed throughout the instant disclosure, the disclosed apparatuses, systems, and methods may provide one or more advantages over traditional display apparatuses, systems, and methods. Accelerating heating of LCD screens may quickly bring the LCD screens up to desirable operating temperatures in various conditions. Rapidly increasing the temperature of LCD screens may substantially reduce or eliminate the appearance of image inconsistencies, such as blurring and/or double images, particularly during operation of the LCD screens after startup of the LCD screens and/or following a low-power use state. Such systems may enhance user experiences while using LCD devices, such as head-mounted-display devices, in a variety of environments, including colder environments.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A display system comprising:
    a plurality of electronic components;
    a liquid crystal display (LCD) screen comprising a backlight unit located adjacent to a rear surface of the LCD screen, wherein the LCD screen is heatable at a base heating rate by operation of the LCD screen and one or more of the plurality of electronic components;
    a printed circuit board assembly comprising at least one electronic component overlapping the rear surface of the LCD screen; and
    a heating subsystem for heating the LCD screen at an accelerated heating rate that is greater than the base heating rate to raise a temperature of the LCD screen above a threshold screen temperature, the heating subsystem comprising the printed circuit board assembly and a thermally conductive layer disposed between the printed circuit board assembly and the rear surface of the LCD screen.

2. The display system of claim 1, wherein the heating subsystem comprises a display-heating module that increases an operating speed of the at least one electronic component of the printed circuit board assembly to generate additional heat at the at least one electronic component.

3. The display system of claim 2, wherein the display-heating module increases the operating speed of the at least one electronic component of the printed circuit board assembly by providing superfluous commands to the at least one electronic component.

4. The display system of claim 2, wherein the at least one electronic component of the printed circuit board assembly comprises at least one of a processing device, a power management device, a memory device, and a communication device.

5. The display system of claim 1, wherein the heating subsystem further comprises a display-heating module that drives the at least one electronic component or at least a portion of the LCD screen while an image is not displayed by the LCD screen.

6. The display system of claim 1, wherein the threshold screen temperature comprises a temperature of between approximately 10° C. and approximately 25° C.

7. The display system of claim 1, wherein:
    the LCD screen comprises:
        a front surface through which image light is emitted; and
        the rear surface disposed opposite the front surface; and
    the heating subsystem produces heat at a location at or adjacent to the rear surface of the LCD screen.

8. The display system of claim 1, wherein the thermally conductive layer comprises at least one of a metal material, a metalloid material, a graphene material, a diamond material, a ceramic material, or a polymer material.

9. The display system of claim 1, wherein the heating subsystem initiates the heating of the LCD screen at the accelerated heating rate at startup of the display system.

10. The display system of claim 1, wherein the heating subsystem ends the heating of the LCD screen at the accelerated heating rate following heating of the LCD screen for a specified period of time.

11. The display system of claim 1, further comprising a temperature sensor, wherein the heating subsystem initiates the heating of the LCD screen when an initial temperature detected by the temperature sensor is below a threshold sensor temperature.

12. The display system of claim 1, further comprising a temperature sensor, wherein the heating subsystem ends the heating of the LCD screen when a subsequent temperature detected by the temperature sensor is at or above a threshold sensor temperature.

13. A head-mounted-display device comprising:
    a display housing;
    a plurality of electronic components disposed within the display housing;
    an LCD screen disposed within the display housing, the LCD screen comprising a backlight unit located adjacent to a rear surface of the LCD screen, the LCD screen being heatable at a base heating rate by operation of the LCD screen and one or more of the plurality of electronic components;
    a printed circuit board assembly comprising at least one electronic component overlapping the rear surface of the LCD screen; and
    a heating subsystem for heating the LCD screen at an accelerated heating rate that is greater than the base heating rate to raise a temperature of the LCD screen above a threshold screen temperature, the heating subsystem comprising the printed circuit board assembly and a thermally conductive layer disposed between the printed circuit board assembly and the rear surface of the LCD screen.

14. A method comprising:
    providing a display system comprising:
        a plurality of electronic components;
        an LCD screen comprising a backlight unit located adjacent to a rear surface of the LCD screen, wherein the LCD screen is heatable at a base heating rate by operation of the LCD screen and one or more of the plurality of electronic components;
        a printed circuit board assembly comprising at least one electronic component overlapping the rear surface of the LCD screen; and
        a heating subsystem for heating the LCD screen at an accelerated heating rate that is greater than the base heating rate, the heating subsystem comprising the printed circuit board assembly and a thermally conductive layer disposed between the printed circuit board assembly and the rear surface of the LCD screen
    operating the LCD screen and the plurality of electronic components; and
    heating, by the heating subsystem, the LCD screen at the accelerated heating rate to raise a temperature of the LCD screen above a threshold screen temperature.

* * * * *